Nov. 10, 1953     M. B. MILLER ET AL     2,658,643
COOKING APPLIANCE
Filed Aug. 9, 1951
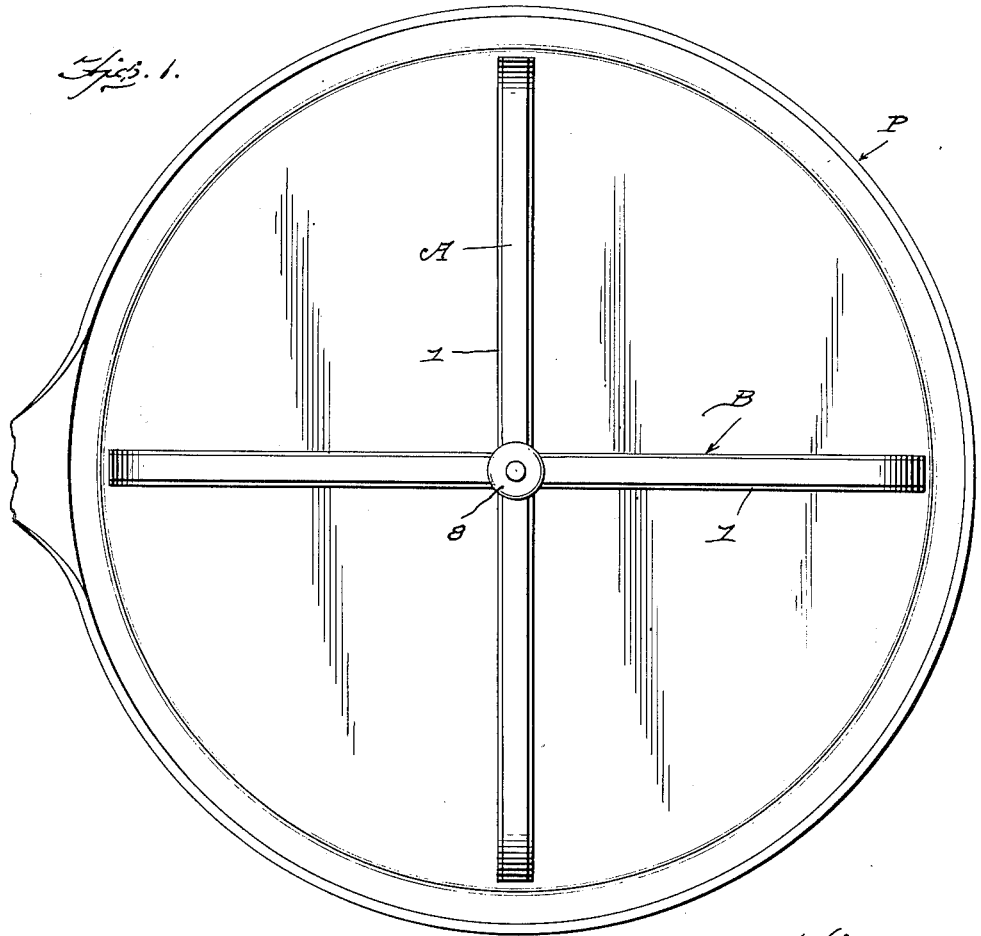
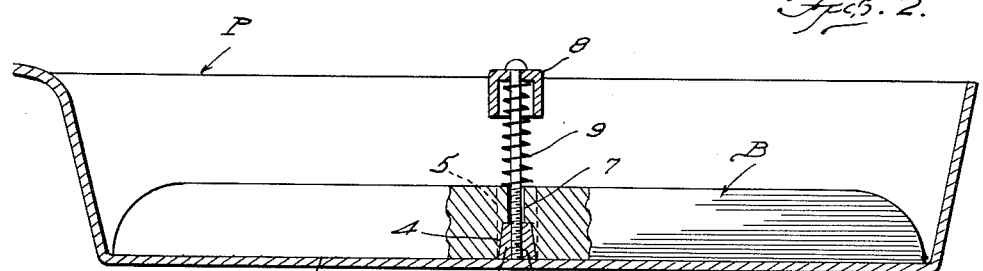
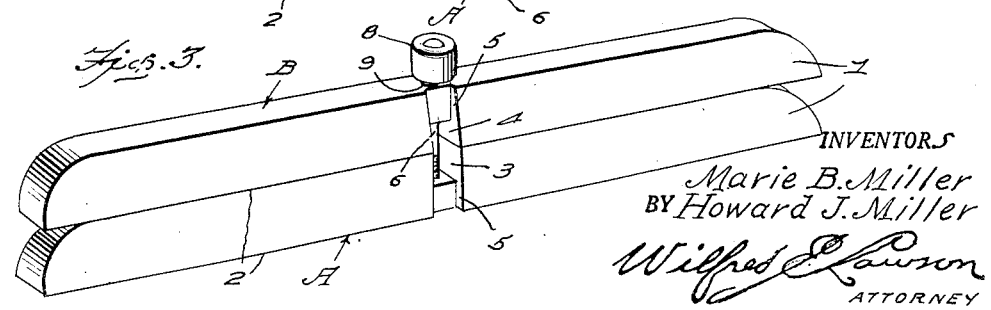
INVENTORS
Marie B. Miller
BY Howard J. Miller
Wilfred E. Lawson
ATTORNEY Patented Nov. 10, 1953

2,658,643

UNITED STATES PATENT OFFICE 2,658,643

COOKING APPLIANCE

Marie B. Miller and Howard J. Miller,
Pasadena, Calif.

Application August 9, 1951, Serial No. 241,026

2 Claims. (Cl. 220—22)

This invention relates to a cooking appliance and it is primarily an object of the invention to provide a device of this kind that may be placed readily within a frying pan or other utensil to provide separate cooking compartments.

It is also an object of the invention to provide an appliance of this kind which can be easily compacted to facilitate shipping and storage.

The invention consists in the details of construction and in the combination and arrangement of the several parts of our improved cooking appliance whereby certain advantages are attained, as will be hereinafter more fully set forth.

In order that our invention may be better understood, we will now proceed to describe the same with reference to the accompanying drawings, wherein:

Figure 1 is a view in top plan of an appliance embodying the invention in applied position, the associated utensil being in fragment;

Figure 2 is a sectional view taken substantially radially through Figure 1, with parts in elevation; and Figure 3 is a view in perspective of the appliance unapplied and in compacted form.

In the embodiment of the invention as illustrated in the accompanying drawing, the appliance comprises two substantially duplicate members A and B, each of a length approximately the internal diameter of a standard size frying pan P or kindred utensil. These members A and B are straight from end to end and having flat sides faces 1 substantially perpendicular to a flat bottom face 2. Each of the members A and B is of a height to provide effective separation for food stuff when the appliance is in working position with a pan P or the like.

One of the members, as A, at its transverse center has extending inwardly from its bottom face 2 and extending transversely therethrough a rectangular notch or slot 3 extending substantially half way of the height of said member A. The second member B at its transverse center is provided in its top face portion with a notch or slot 4 corresponding to the notch or slot 3 and extending halfway through the height of the member.

Each of the slots 3 or 4 is continued by the shallow groove 5 in a side face 1 of a member A or B of the same width as a slot or notch 3 or 4 and extending from the inner or closed end of the slot or notch to the edge face of the member A or B remote from the edge face portion provided with the notch or slot. Each of the notches or slots 3 and 4 is of a width substantially equal to the thickness of a member A or B between the opposed grooves 5 of a member A or B.

The notches or slots 3 and 4 allow the central portions of the members A and B to tightly interlock when said members A and B are in substantially right angular crossed relation so that when the appliance is set within a frying pan P or the like, such utensil is divided into four compartments and the food placed in the several compartments may be readily cooked as desired without the food of one compartment in any mingling with food in the adjacent compartments.

Suitably secured to the member A at the central portion of the inner or closed end of the recess 3, is an end portion of a pivot and coupling pin 6. This pin 6 freely passes through an opening 7 in the member B at substantially the center of the notch or recess 4 in said member B. The outer or free extremity of the pin 6 is provided with an enlargement or head 8 against which bears an expansible member 9 which also bears against the top edge face of the member B. The applied member 9 is at all times under tension and in the present embodiment of the invention this member 9 comprises a coil spring encircling the pin 6.

The spring 9 serves to maintain the members A and B in interlocking engagement when the appliance is in use and also maintains said members in overlying relation when said members A and B are in folded or compacted relation.

The pin 6 is of such length as to permit the required separating movement of the members A and B when it is desired to interlock the same and the head or enlargement 8 of the pin 6 provides a finger hold to facilitate the handling of the appliance when in either extended or working adjustment or when in folded or compacted position.

From the foregoing description it is thought to be obvious that a cooking appliance constructed in accordance with our invention is particularly well adapted for use by reason of the convenience and facility with which it may be assembled and operated.

We claim:

1. A device for dividing a cooking receptacle into separate cooking areas, said device comprising two elongate members of equal length and having upright side faces, each member having a flat bottom face to rest flat upon the bottom of the cooking receptacle, one of said members having a slot formed transversely of the top midway between its ends and through half of its height, the other member having a corresponding slot formed transversely of its bottom midway between its ends and extending through half of its height, the mid portion of each member fitting in the slot of the other member to couple the members in perpendicular relation with the bottom faces in a common plane, an elongate coupling and pivot pin extending vertically through the said mid portions and through the slots, said pin having a length greater than the combined heights of the two members whereby one of the members may be elevated and turned to a position above and parallel with the lower member, and spring means for yieldingly maintaining the members in the said coupled relation.

2. A device of the character stated in claim 1, with a head carried upon the upper end of said pin, and said spring means comprising a coil spring encircling the pin and interposed between said head and the underlying mid portion of the last named one of the members.

MARIE B. MILLER.
HOWARD J. MILLER.

References Cited in the file of this patent

UNITED STATES PATENTS

| Number | Name | Date |
|---|---|---|
| 348,839 | Grosz | Sept. 7, 1886 |
| 757,951 | McFarland | Apr. 19, 1904 |
| 1,290,186 | Held | Jan. 7, 1919 |
| 1,371,195 | Boyce | Mar. 8, 1921 |
| 2,064,716 | Baker | Dec. 15, 1936 |